: US 9,999,088 B2
(45) Date of Patent: Jun. 12, 2018

(12) United States Patent
Tirronen et al.

(54) APPARATUS AND METHOD FOR PROVIDING POWER SAVING DURING IDLE TO CONNECTED MODE TRANSITIONS

(71) Applicant: TELEFONAKTIEBOLAGET L M ERICSSON (PUBL), Stockholm (SE)

(72) Inventors: Tuomas Tirronen, Helsinki (FI); Anna Larmo, Espoo (FI); Riikka Susitaival, Helsinki (FI); Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 34 days.

(21) Appl. No.: 14/784,338

(22) PCT Filed: Apr. 4, 2014

(86) PCT No.: PCT/SE2014/050419
§ 371 (c)(1),
(2) Date: Oct. 14, 2015

(87) PCT Pub. No.: WO2014/171883
PCT Pub. Date: Oct. 23, 2014

(65) Prior Publication Data
US 2016/0057807 A1 Feb. 25, 2016

Related U.S. Application Data

(60) Provisional application No. 61/811,922, filed on Apr. 15, 2013.

(51) Int. Cl.
*H04W 76/04* (2009.01)
*H04W 52/02* (2009.01)

(52) U.S. Cl.
CPC ....... *H04W 76/048* (2013.01); *H04W 52/028* (2013.01); *H04W 52/0216* (2013.01);
(Continued)

(58) Field of Classification Search
CPC ............. H04W 76/048; H04W 52/028; H04W 52/0216; H04W 52/0235; H04W 52/0251
See application file for complete search history.

(56) References Cited

U.S. PATENT DOCUMENTS 8,156,359 B1 * 4/2012 Sedarat ................ G06F 1/3209
370/278
9,693,306 B2 * 6/2017 Young ............... H04W 52/0235
(Continued)

FOREIGN PATENT DOCUMENTS

WO  WO 2012/025825 A2  3/2012

OTHER PUBLICATIONS

Qualcomm. LTE Data Communication Enhancement Proposals. 3GPP TSG SA WG1#55. Aug. 8-12 Dublin, Ireland. S1-112118. Aug. 1, 2011.
(Continued)

*Primary Examiner* — Rasheed Gidado

(57) ABSTRACT

A method of saving power in a user device that is operable in a discontinuous reception mode, the user device comprising a receiver circuitry. The method comprises the steps of powering down at least a part of the receiver circuitry during one or more predefined power down periods during a transition between an idle mode of operation and a connected mode of operation.

24 Claims, 15 Drawing Sheets

(52) U.S. Cl.
CPC ... *H04W 52/0235* (2013.01); *H04W 52/0251* (2013.01); *H04W 76/04* (2013.01); *H04W 76/046* (2013.01); *Y02D 70/00* (2018.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | | | |
|---|---|---|---|---|
| 2005/0030160 | A1* | 2/2005 | Goren | G06K 7/0008 340/10.5 |
| 2006/0087993 | A1* | 4/2006 | Sengupta | H04W 68/00 370/310 |
| 2007/0260794 | A1* | 11/2007 | Ashish | G06F 1/3203 710/267 |
| 2009/0239566 | A1* | 9/2009 | Pelletier | H04W 56/005 455/517 |
| 2009/0312004 | A1 | 12/2009 | Farnsworth et al. | |
| 2011/0195714 | A1* | 8/2011 | Sawinathan | H04W 60/005 455/435.1 |
| 2012/0113904 | A1 | 5/2012 | Anderson et al. | |
| 2012/0157153 | A1* | 6/2012 | Song | H04W 52/0245 455/522 |
| 2012/0207070 | A1* | 8/2012 | Xu | H04W 48/20 370/311 |
| 2012/0233481 | A1 | 9/2012 | Henttonen et al. | |
| 2012/0307703 | A1 | 12/2012 | Young et al. | |
| 2013/0044661 | A1* | 2/2013 | Jokimies | H04W 52/0274 370/311 |
| 2014/0274038 | A1* | 9/2014 | Singhal | H04W 52/0209 455/434 |
| 2015/0043405 | A1* | 2/2015 | Uchino | H04L 5/001 370/311 |
| 2015/0163745 | A1* | 6/2015 | Kim | H04W 52/0235 370/311 |

OTHER PUBLICATIONS

ZTE. Discussion on MTC features Priorities.3GPP TSG-RAN WG3#67, R3-1 00874, Feb. 22-26, San Francisco, Feb. 12, 2010.

3rd Generation Partnership Project; Technical Specification Group Radio Access Network; Evolved Universal Terrestrial Radio Access (E-UTRA); User Equipment (UE) radio access capabilities (Release 11). 3GPP TS 36.306 V11.2.0 (Dec. 2012).

3rd Generation Partnership Project; Technical Specification Group Radio Access Network; Evolved Universal Terrestrial Radio Access (E-UTRA); Radio Resource Control (RRC); Protocol specification (Release 11). 3GPP TS 36.331 V11.2.0 (Dec. 2012).

3rd Generation Partnership Project; Technical Specification Group Radio Access Network; Evolved Universal Terrestrial Radio Access (E-UTRA); Medium Access Control (MAC) protocol specification (Release 11). 3GPP TS 36.321 V11.0.0 (Sep. 2012).

* cited by examiner

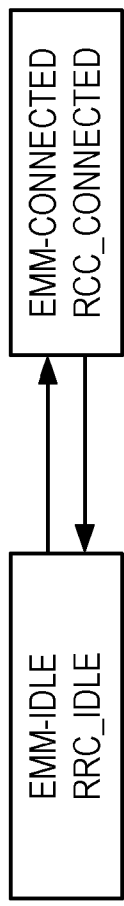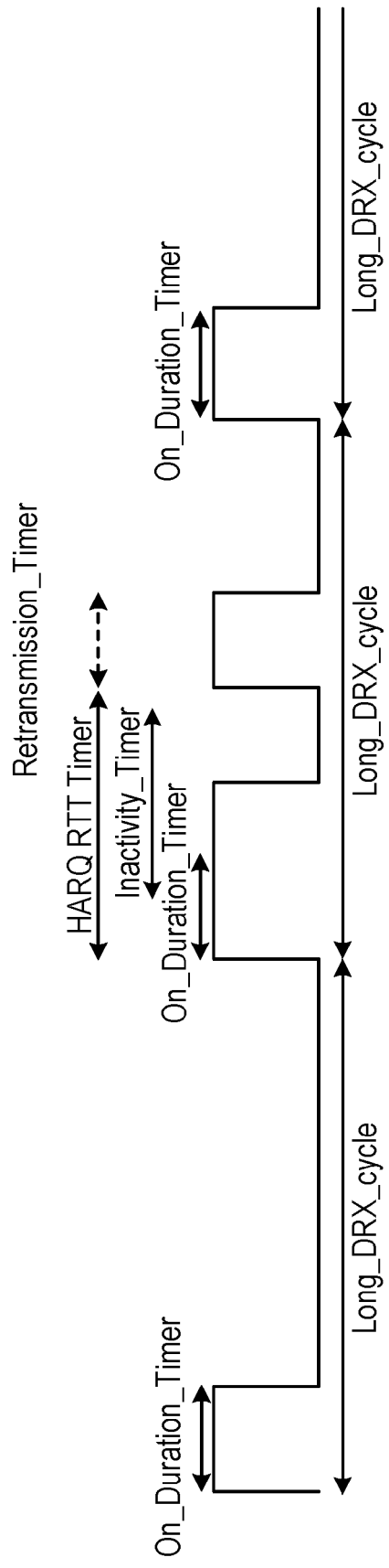
Fig. 1a
Fig. 1b

APPARATUS AND METHOD FOR PROVIDING POWER SAVING DURING IDLE TO CONNECTED MODE TRANSITIONS

This application claims the benefit of U.S. Provisional Application No. 61/811,922, filed Apr. 15, 2013, the disclosure of which is fully incorporated herein by reference.

TECHNICAL FIELD

The present invention relates to an apparatus and method for providing discontinuous reception mode communication, and in particular to an apparatus and method for saving power in a user device that is operable in a discontinuous reception mode.

BACKGROUND

Communication using cellular networks has traditionally been used for mobile phone applications for voice communication, and more recently applications that allow smartphones, tablets, computers and the like to handle data communications, such as Internet browsing and so forth.

A currently popular vision of the future development of communication using cellular networks is the possibility of having huge numbers of small autonomous devices which typically transmit and receive only small amounts of data infrequently (for example once per week to once per minute), or which are polled for data. These devices are assumed not to be associated with humans, but are rather sensors or actuators of different kinds, which communicate with application servers that configure the devices and receive data from them, within or outside the cellular network. Hence, this type of communication is often referred to as machine-to-machine (M2M) communication, and the devices may be denoted machine devices (MDs). In the Third Generation Partnership Project (3GPP) standardization, the corresponding alternative terms are machine type communication (MTC) and machine type communication devices (MTC devices), with the latter being a subset of the more general term user equipment (UE).

Due to the nature of MTC devices and their assumed typical applications, it follows that they will often have to be very energy efficient, since external power supplies will often not be available, and since it is neither practically nor economically feasible to frequently replace or recharge their batteries. In some scenarios the MTC devices may not even be battery powered, but may instead rely on energy harvesting, i.e. gathering energy from the environment, opportunistically utilizing (the often very limited) energy that may be tapped from sunlight, temperature gradients, vibrations, and so on.

For such energy deprived devices whose traffic is characterized by small and infrequent transactions (often delay tolerant), it is important to minimize their energy consumption.

During the time periods between communication events the devices consume energy, for example by keeping the radio receiver active to monitor transmissions from the cellular network. Since the periods between the communication events are far longer than the actual communication events, this energy consumption represents a significant part of the overall energy consumption, and may even dominate the energy consumption in scenarios where the communication events are very infrequent.

During the communication events the actual uplink (UL) transmissions naturally consume significant amounts of energy. This is magnified by the large control signalling overhead that may be associated with a communication event.

A mechanism that has been introduced in cellular networks in order to save energy in user equipment devices, for example between communication events, is the discontinuous reception (DRX) mode of operation. The discontinuous reception mode allows a user equipment device to remain in an energy-saving sleep state most of the time, while waking up to listen for pages in idle mode DRX, or downlink resource assignments (i.e. downlink transmissions) in connected mode DRX.

FIG. 1a shows the idle and connected modes of a communication system, for example the RCC_IDLE and RCC_CONNECTED states of the Radio Resource Control (RRC) connection states, or the EMM-IDLE and EMM-CONNECTED states of the Evolved Packet System (EPS) Mobility Management (EMM) connection states. During the RRC_IDLE or EMM-IDLE states a user device listens to paging messages (at rare occasions) and is otherwise in a DRX sleep mode, i.e. energy saving mode. During the RCC_CONNECTED or EMM-CONNECTED states the user device is known on a cell level, but does not necessarily have an uplink grant or a downlink assignment. The user device may have DRX settings that are specific to that user device. FIG. 1b shows how various timers, such as inactivity timers, on-duration timers, retransmission timers, are used during DRX cycles in an RRC_CONNECTED state.

In order to make DRX mechanisms even more effective for energy deprived MTC devices, 3GPP is working on extending the maximum DRX cycle length, and thus the sleep period, both for idle mode DRX and connected mode DRX. Therefore, a DRX cycle essentially consists of a sleep period followed by an active period and this cycle is repeated over and over again until the device is detached from the network. Typically, but not necessarily, the sleep period is longer than the active period. A DRX cycle may have a more complex structure than described above, but for the purpose of this patent application, the simplified DRX cycle description suffices.

The idle mode DRX cycle, i.e. the paging cycle, is configured in the user equipment device through parameters in the system information (SI) that is broadcast in each cell, in conjunction with UE specific parameters in the form of International Mobile Subscriber Identity, IMSI, modulo 1024 and an optional UE specific DRX cycle length. Alternatively, it is also possible to configure a UE specific paging cycle. The connected mode DRX cycle and other DRX parameters (when used) are configured in the UE through optional parameters typically in a RRCConnectionReconfiguration message, during the idle to connected mode transition or later during the connected mode.

Although DRX provides power saving capabilities, UE or MTC devices having communication events which are short and often infrequent suffer from the disadvantage that power consumption is still a problem, especially since an infrequently communicating MTC device (or other UE) will go through a transition from an idle mode to a connected mode prior to every communication event. FIG. 2 illustrates the extensive signalling procedure involved during a typical transition from an idle mode to a connected mode (further details of which will be described later). This signalling during a transition from one mode to another can contribute a significant factor to the overall energy consumption of such devices.

SUMMARY

It is an aim of the present invention to provide a method and apparatus which obviate or reduce at least one or more of the disadvantages mentioned above.

According to a first aspect of the present invention there is provided a method of saving power in a user device that is operable in a discontinuous reception mode, the user device comprising a receiver circuitry. The method comprises the steps of powering down at least a part of the receiver circuitry during one or more predefined power down periods during a transition between an idle mode of operation and a connected mode of operation.

According to another aspect of the present invention there is provided a user device that is operable in a discontinuous reception mode. The user device comprises receiver circuitry and a processing unit. The processing unit is adapted to power down at least a part of the receiver circuitry during one or more predefined power down periods during a transition between an idle mode of operation and a connected mode of operation of the user device.

According to another aspect there is provided a method in a control node of a communication system, the communication system comprising one or more user devices that are operable in a discontinuous mode of operation. The method comprises the steps of determining a system information parameter relating to a processing event performed in the control node, and transmitting the system information parameter to the one or more user devices, for use by one or more user devices for powering down at least a part of their respective receiver circuitry during a transition between an idle mode of operation and a connected mode of operation.

According to another aspect, there is provided a control node of a communication system, the communication system comprising one or more user devices that are operable in a discontinuous mode of operation. The control node comprises a processing unit adapted to determine a system information parameter relating to a processing event performed in the control node. The control node also comprises a transmitting unit adapted to transmit the system information parameter to the one or more user devices, for use by one or more user devices for powering down at least a part of their respective receiver circuitry during a transition between an idle mode of operation and a connected mode of operation.

BRIEF DESCRIPTION OF THE DRAWINGS

For a better understanding of the present invention, and to show more clearly how it may be carried into effect, reference will now be made, by way of example only, to the following drawings in which:

FIG. 1a shows the idle and connected modes of a communication system;

FIG. 1b shows an example of a discontinuous reception (DRX) mode of a connected state of a communication system;

DETAILED DESCRIPTION

The embodiments of the invention will be described below in the context of a Long Term Evolution Evolved Packet System (LTE-EPS). It is noted, however, that the invention is also intended to be applicable to other wireless technologies, such as Universal Mobile Telecommunications System (UMTS), Wideband Code Division Multiple Access (WCDMA) and High Speed Packet Access (HSPA) systems.

It is also noted that references herein to a user device are intended to embrace any form of user device, including but not limited to a user equipment device (UE), a machine device (MD) or a machine type communication (MTC) device.

The inventors have realised that, although discontinuous reception mode (DRX) can provide power saving capabilities for communication systems, user devices having communication events which are short and often infrequent still suffer from the disadvantage that the signalling that takes place during a transition from one mode to another, (for example from a Radio Resource Control (RRC) idle mode to an RRC connected mode, or from an EPS Mobility Management (EMM) idle mode to an EMM connected mode (or ECM-IDLE mode to ECM-CONNECTED mode), can contribute a significant factor to the overall energy consumption of such devices.

In the embodiments described below, references to a transition between an idle mode and a connected mode, are intended to include any of the examples described in the preceding paragraph, relating to RRC or EMM applications, or indeed between an idle mode and a connected mode of some other communication protocol.

Although the DRX mechanisms described in the background section provide energy saving mechanisms for user equipment devices, being defined for both idle mode and connected mode per se, i.e. when in an idle mode per se, or in a connected mode per se, there is a long period during the idle to connected mode transition phase where there are no power saving mechanisms available.

When the communication events are short and infrequent, each communication event is likely to be preceded by an idle to connected mode transition, and the transition is likely to take a significant portion of the time needed to perform the data transmission. Furthermore, the potential use of long connected mode DRX cycles also increases the risk of radio link failure during mobility between cells, which means that an idle to connected mode transition will be triggered many times in such scenarios too.

Figure 3:
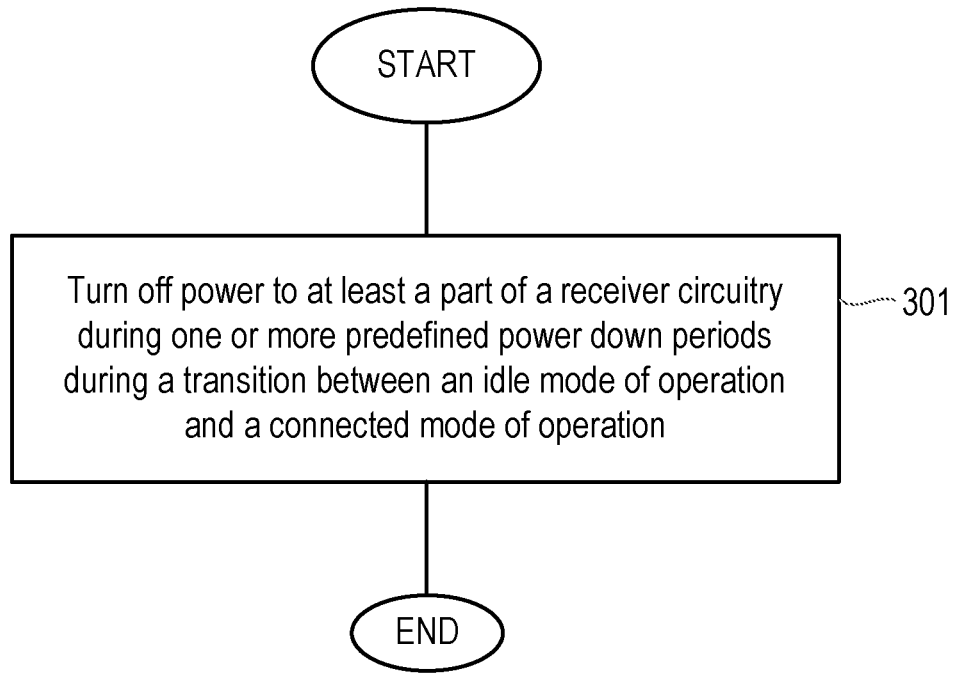
FIG. 3 shows a method according to an embodiment of the present invention.

FIG. 3 shows a method according to a first embodiment of the present invention. The method comprises the step of saving power in a user device that is operable in a discontinuous reception mode, wherein the user device comprises a receiver circuitry. The method comprises the steps of powering down at least a part of the receiver circuitry during one or more predefined power down periods during a transition between an idle mode of operation and a connected mode of operation, step 301.

This has the advantage of allowing at least part of a receiver circuitry to be powered down during this transition phase from an idle mode to a connected mode. Powering down part or whole of the receiver circuitry (or circuitry associated therewith) is particularly advantageous in machine-to-machine type applications where communication events tend to be few and far between.

This is because the connection setup procedure typically involves the exchange of a large number of signalling messages, such that the control plane communication is likely to dominate over the user plane communication. In other words, the control plane communication is likely to comprise more messages, larger data volumes and consume more energy, than the user plane communication. Furthermore, since the signalling procedure involves many nodes in the network as well as significant processing in the network nodes, e.g. in order to set the appropriate configuration parameters, the time intervals separating the messages may be significant. Hence, the embodiments of the invention avoid the need for a user device such as an MTC device (or other UE device) to actively listen for downlink transmissions during the entire idle to connected mode transition.

Therefore, embodiments of the invention allow energy consumption to be saved during the transition from idle mode to connected mode, thus having a positive impact on the battery lifetime of a user device, which is particularly advantageous in energy deprived user devices.

Figure 4:
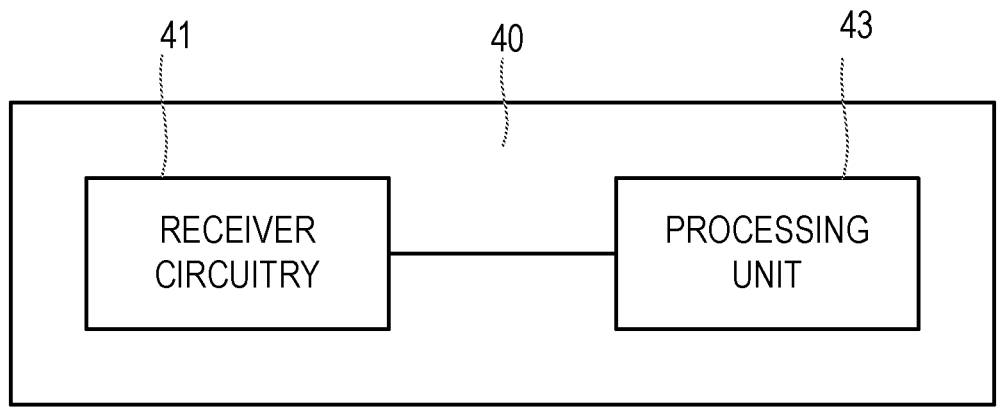
FIG. 4 shows an apparatus according to an embodiment of the present invention.

FIG. 4 shows a user device 40 according to another embodiment of the present invention, the user device 40 being operable in a discontinuous reception mode. The user device 40 comprises receiver circuitry 41 and a processing unit 43. The processing unit 43 is adapted to power down at least a part of the receiver circuitry during one or more predefined power down periods during a transition between an idle mode of operation and a connected mode of operation of the user device 40.

According to one embodiment, the one or more predefined power down periods are triggered by a downlink message received by the user device, and/or an uplink message transmitted from the user device, during the transition between the idle mode of operation and the connected mode of operation.

This has the advantage of a predefined power down period being triggered from a known type of message (or messages), such that each type of message can have an associated power down period.

Figure 2A:
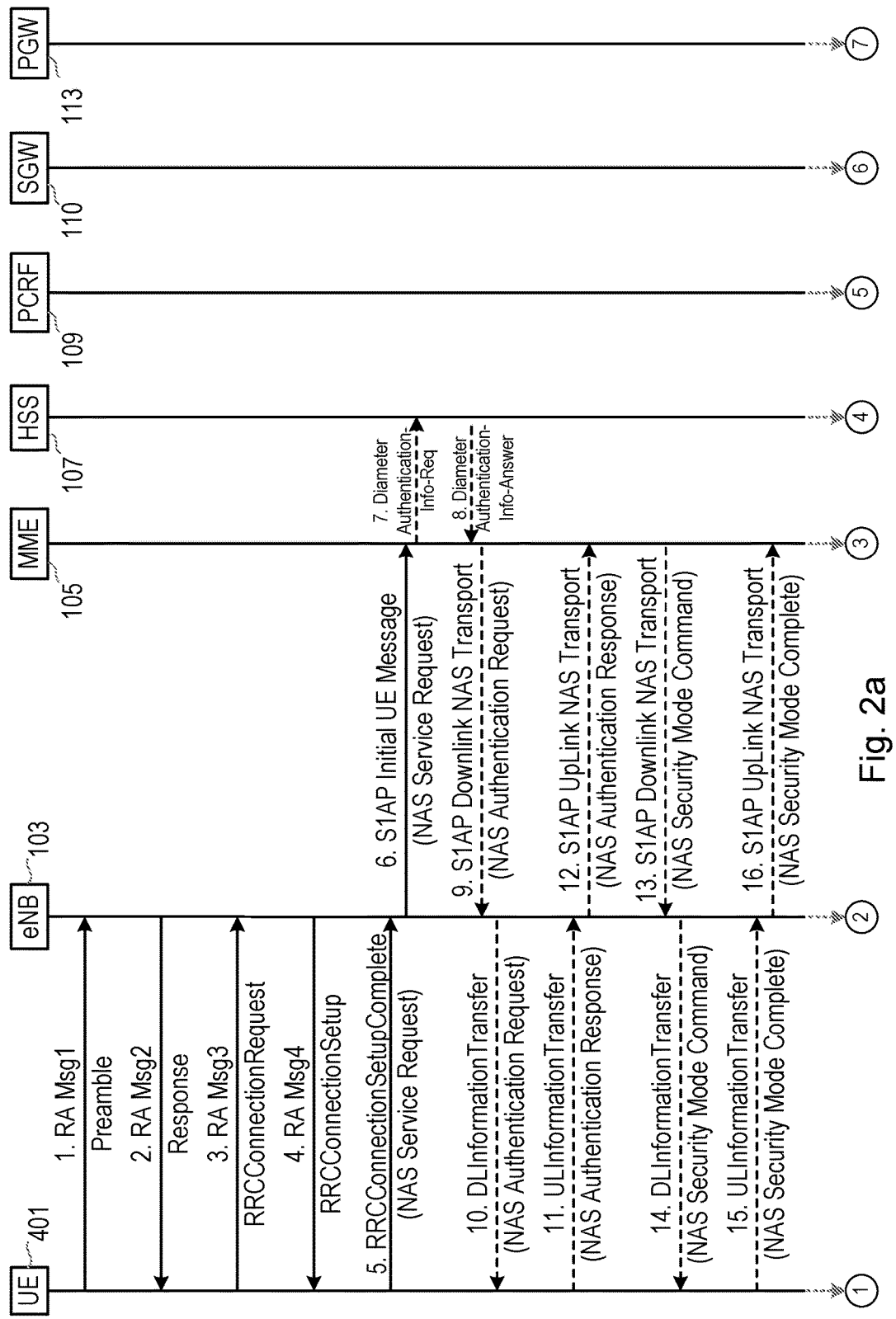
FIG. 2 (comprising FIGS. 2a and 2b) shows a typical signalling diagram during a transition from an idle mode to a connected mode.
Figure 2B:
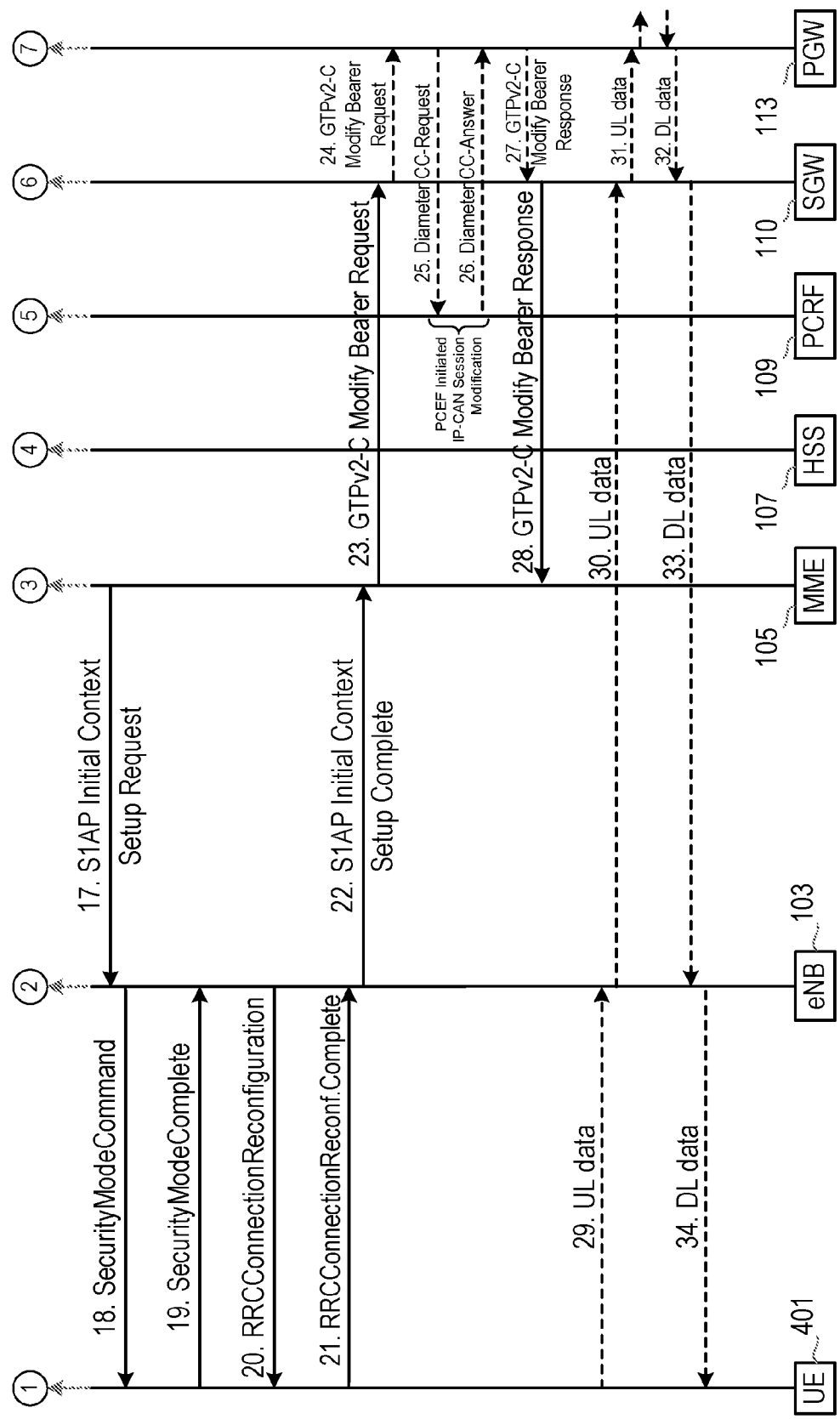
Figure 5A:
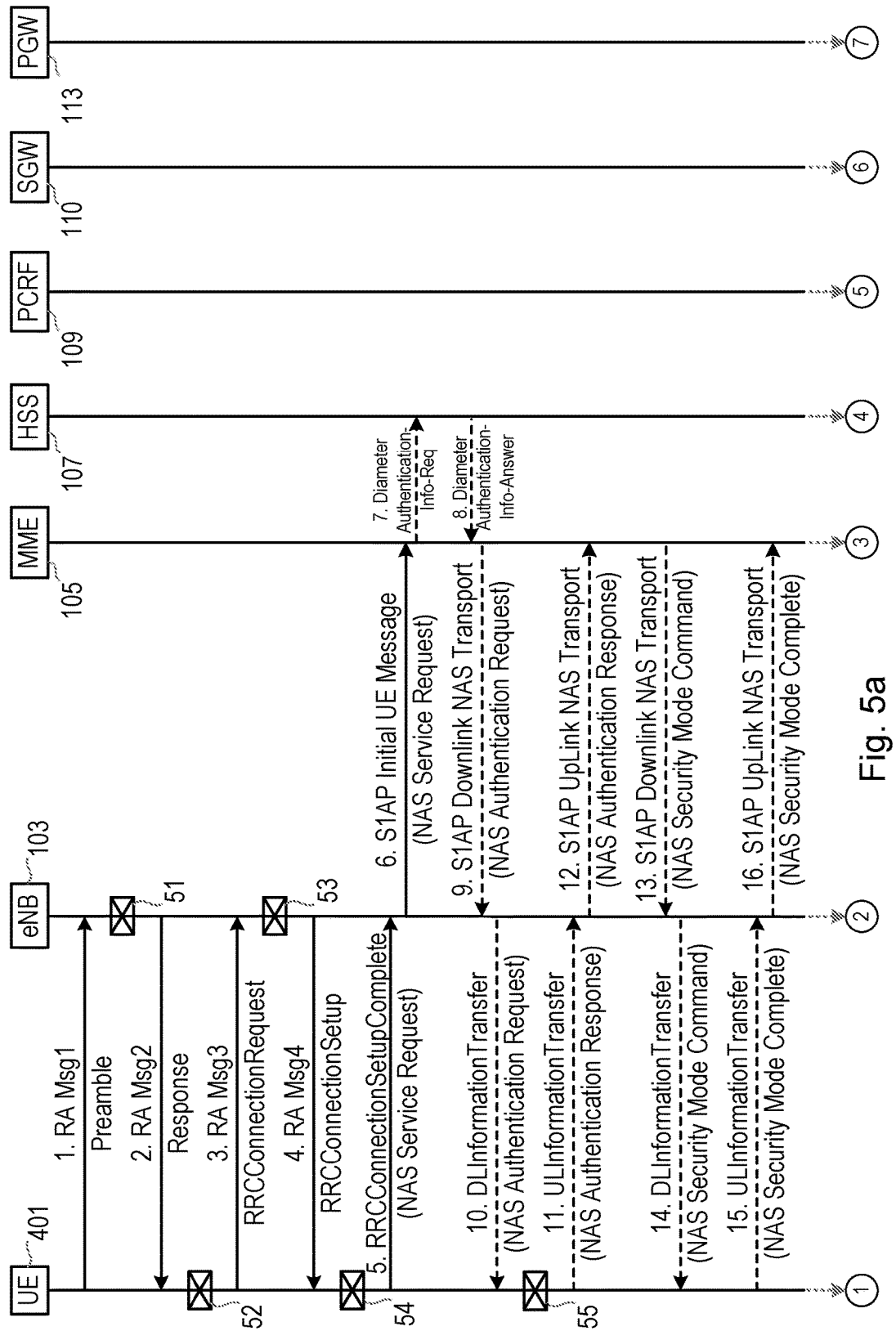
FIG. 5 (comprising FIGS. 5a and 5b) shows an example of a signalling diagram during a transition from an idle mode to a connected mode, and how embodiments of the invention may be used with such a signalling diagram.
Figure 5B:
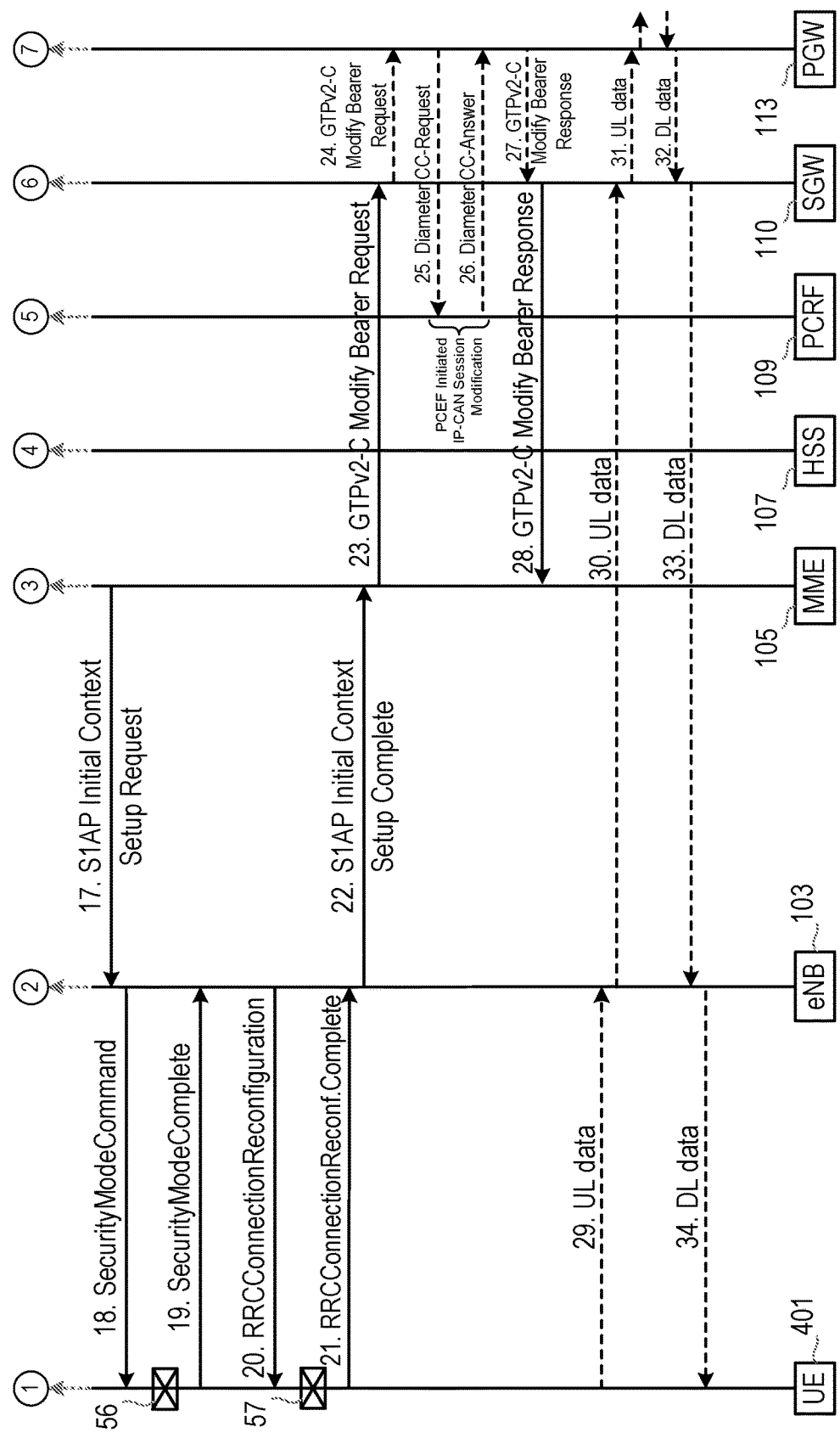

For example, FIG. 5 shows an example of a typical signalling sequence between a transition from an idle mode of operation to a connected mode of operation (similar to that shown in FIG. 2), but also shows examples of some of the one or more predefined power down periods 51 to 57 that can be used to save power consumption in a user device during the transition from an idle to a connected mode.

Further details of each of the power down periods 51 to 57 will be provided with reference to FIGS. 6 to 13 below. For simplicity it is noted that only some examples are shown in FIG. 5, and that other predefined power down periods may also be provided, for example in relation to other messages being received by, or transmitted from the user device (or in relation to a processing task being carried out by the user device, or another device or node). It is also noted that whilst FIG. 5 shows one example of the signalling messages that may exist during a transition from an idle mode of operation to a connected mode of operation, the signalling messages during this transitional phase may comprise a different set of signalling messages, for example having fewer signalling messages than those shown in FIG. 5, or having a greater number of signalling messages than those shown in FIG. 5, or having one or more different signalling messages. As such, according to one example the transition from idle mode to connected mode may comprise a period during which signalling messages corresponding to messages 1 to 21 of FIG. 5 exist, while another example may comprise a transition period during which signalling messages corresponding to messages 1 to 4 of FIG. 5 exist. Any of these signalling messages may be used alone, or in combination, to trigger or help determine when a power down period should exist.

According to one embodiment the method comprises the steps of receiving a downlink message during the transition from the idle mode of operation to the connected mode of operation, and powering down at least a part of the receiver circuitry during a period when the user device is processing the received downlink message.

This has the advantage of powering down part or whole of the receiver circuitry when a received message is being processed by the user device, during which time the user device is not expecting another downlink message.

According to another embodiment, the method comprises the steps of receiving a downlink message during the transition from the idle mode of operation to the connected mode of operation, and powering down at least a part of the receiver circuitry during a period when the user device is preparing a future uplink message and/or waiting for an uplink transmission resource to be available.

This has the advantage of powering down a part or whole of the receiver circuitry while the user device is preparing a future uplink message and/or waiting for an uplink resource to become available. This power down period may be combined with the power down period described above, such that the user device powers down part or whole of the receiver circuitry while processing a received downlink message, preparing the next uplink message and/or waiting for uplink resources to become available.

According to another embodiment the method may further comprise the steps of transmitting an uplink message during the transition from the idle mode of operation to the connected mode of operation, and powering down at least a part of the receiver circuitry during transmission of the uplink message.

This has the advantage of powering down a part or whole of the receiver circuitry while the user device is transmitting an uplink message (and hence not listening for a downlink message). It is noted that this predefined power down period may be combined with any one or more of the other predefined power down periods described above. For example, this predefined power down period may be combined such that the user device powers down part or whole of the receiver circuitry while processing a received downlink message, preparing the next uplink message, waiting for uplink resources to become available, and/or while transmitting the uplink message from the user device.

According to another embodiment a predefined power down period may comprise a period when another device is processing an uplink message which has been transmitted from the user device.

This has the advantage of powering down a part or whole of the receiver circuitry while another node or device is processing the uplink message which has just been transmitted from the user device. This takes advantage of the fact that the user device does not expect to receive a downlink message until the other node or device has processed the uplink message which has just been sent. It is noted that this predefined power down period may be combined with any one or more of the other predefined power down periods described above. For example, this predefined power down period may be combined such that the user device powers down part or whole of the receiver circuitry while processing a received downlink message, preparing the next uplink message, waiting for uplink resources to become available, while transmitting the uplink message from the user device, and/or while another device is processing a transmitted message.

FIGS. 6 to 11 describe examples of embodiments whereby a part or whole of a receiver circuitry is powered down after downlink reception, before uplink transmission, while the user device is processing the received downlink and/or future uplink data and while it is waiting for uplink transmission resources to occur.

Figure 6:
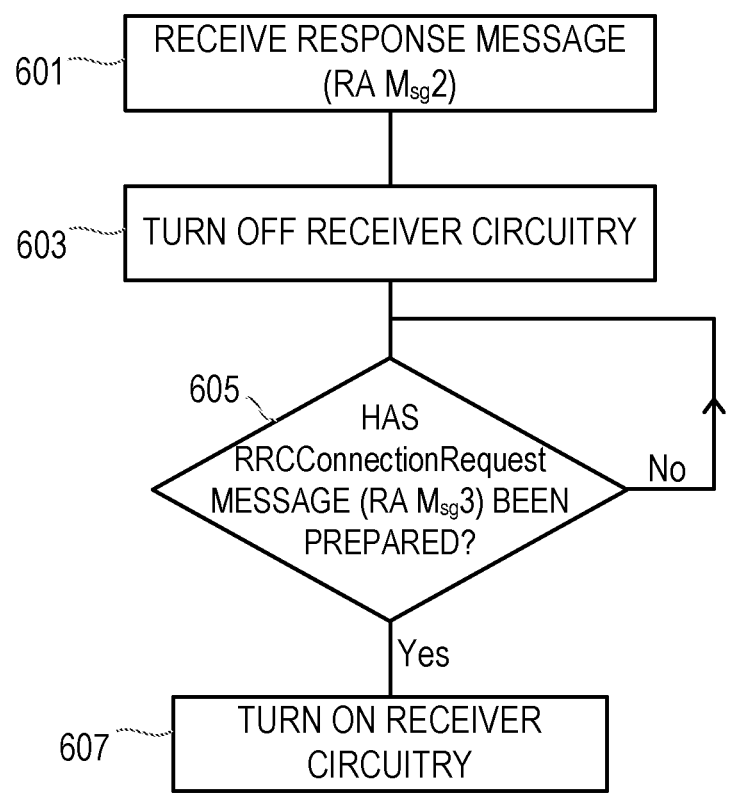
FIG. 6 shows a method according to another embodiment of the invention.

Referring to FIG. 6 in combination with FIG. 5, this describes an example of how a part or whole of a receiver circuitry may be powered down during a time period 52 shown in FIG. 5. The user device 40 receives a message, for example a random access Response message (RA Msg2), step 601. In step 603 the user device turns off the receiver circuitry of the user device. It is noted that this may involve powering down a part or the whole receiver circuitry, or circuitry associated with the receiver circuitry. In step 605 a processing unit of the user device determines whether a subsequent message has been prepared, for example whether a RRCConnectionRequest message (RA Msg3) has been prepared, and if so turns on the receiver circuitry, step 607. As such, according to this example the receiver circuitry is powered down while the user device is processing the random access Response message (RA Msg2) and until the user device has prepared a RRCConnectionRequest message (RA Msg3). This power down period therefore includes the time period for processing the received random access Response message (e.g. RA Msg2) and preparing the subsequent uplink message (e.g. RA Msg3).

Figure 7:
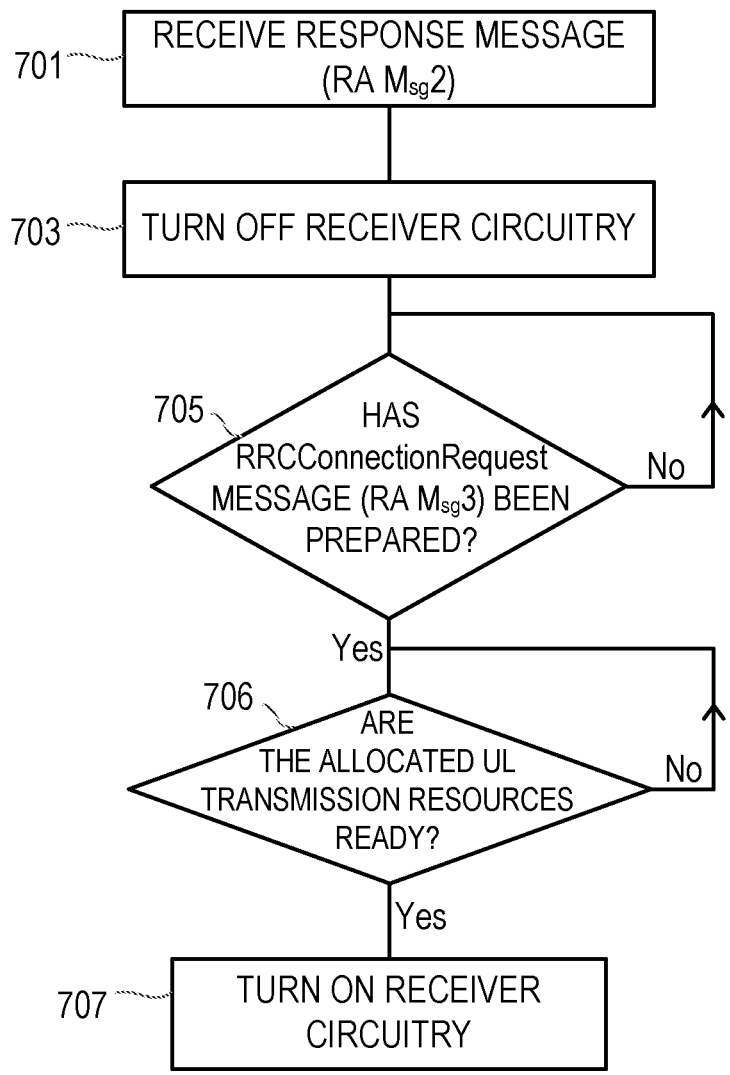
FIG. 7 shows a method according to another embodiment of the invention.

Referring to FIG. 7 in combination with FIG. 5, this also describes an example of how a part or whole of a receiver circuitry may be powered down during a time period 52 shown in FIG. 5. The user device 40 receives a message, for example a random access Response message (RA Msg2), step 701. In step 703 the user device powers down the receiver circuitry of the user device. It is noted that this may involve powering down or turning off a part or the whole receiver circuitry, or circuitry associated with the receiver circuitry. In step 705 a processing unit of the user device determines whether a subsequent uplink message, for example a RRCConnectionRequest message (RA Msg3) has been prepared. In step 706 it is determined whether the allocated uplink transmission resources are ready or available for the subsequent uplink message, and if so the receiver circuitry is turned on, step 707. As such, according to this example the receiver circuitry is powered down while the user device is processing the random access Response message (RA Msg2) and until the uplink resources are ready or available. This power down period therefore includes the time period for processing the received message (e.g. RA Msg2), preparing the subsequent uplink message (e.g. RA Msg3) and waiting for the allocated uplink transmission resources to be ready or occur.

According to another embodiment (not shown in a specific flow chart), the time period 52 of FIG. 5 can be similar to that described above for FIG. 7, but also include the time period for transmitting the uplink message, e.g. the RA Msg3 message.

Figure 8:
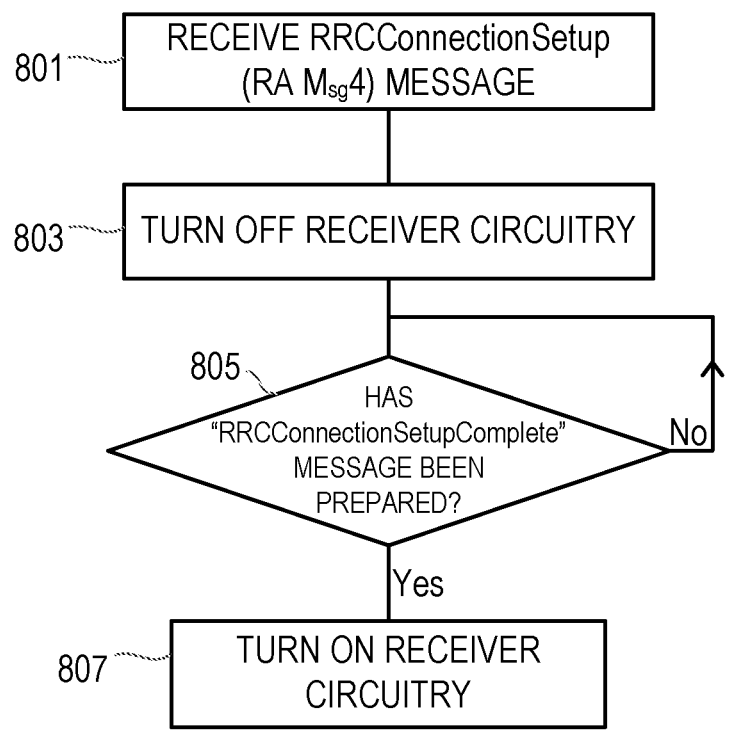
FIG. 8 shows a method according to another embodiment of the invention.

Referring to FIG. 8 in combination with FIG. 5, this describes an example of how a part or whole of a receiver circuitry may be powered down during a time period 54 shown in FIG. 5. The user device 40 receives a message, for example a RRCConnectionSetup (RA Msg4) message, step 801. In step 803 the user device powers down the receiver circuitry of the user device. It is noted that this may involve powering down a part or the whole receiver circuitry, or circuitry associated with the receiver circuitry. In step 805 a processing unit of the user device determines whether a subsequent uplink message, for example a RRCConnectionSetupComplete message has been prepared, and if so turns on the receiver circuitry, step 807. As such, according to this example the receiver circuitry is powered down while the user device is processing the received RRCConnectionSetup message and until the user device has prepared the subsequent RRCConnectionSetupComplete message.

According to another embodiment (not shown in a specific flow chart), the time period 54 of FIG. 5 can be similar to that described above for FIG. 8, but also include a time period until the user device sends a scheduling request to get uplink resources to transmit the RRCConnectionSetupComplete message, and/or the time period waiting for an uplink resource to become ready or available, and/or the time period for transmitting the RRCConnectionSetupComplete message. The minimum time period between the transmission of a scheduling request to an Evolved NodeB (eNB) and a consequently triggered uplink grant on the PDCCH is limited by the processing time required in the eNB for processing the scheduling request and performing the scheduling of uplink transmission resources.

Figure 9:
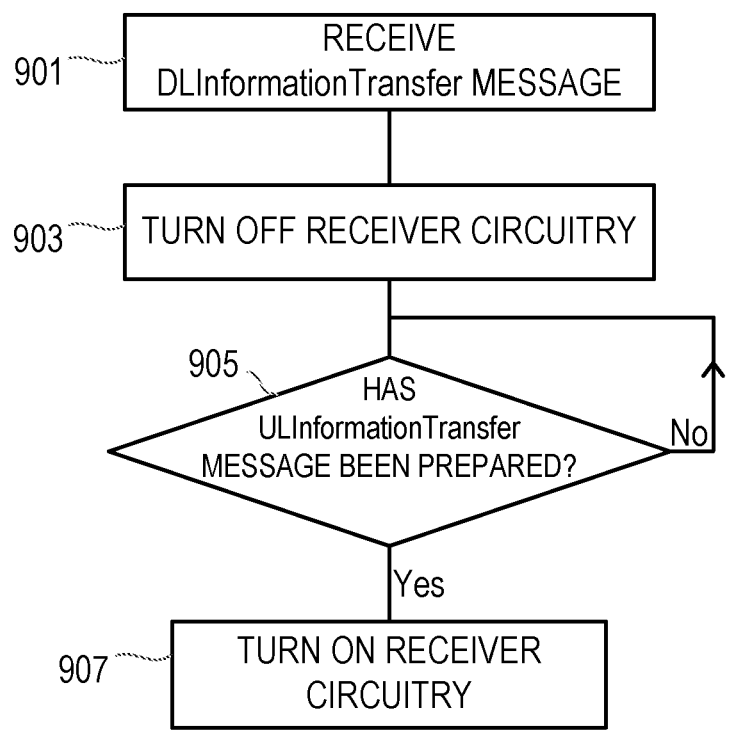
FIG. 9 shows a method according to another embodiment of the invention.

Referring to FIG. 9 in combination with FIG. 5, this describes an example of how a part or whole of a receiver circuitry may be powered down during a time period 55 shown in FIG. 5. The user device 40 receives a message, for example a DLInformationTransfer message, step 901. In step 903 the user device powers down the receiver circuitry of the user device. It is noted that this may involve powering down a part or the whole receiver circuitry, or circuitry associated with the receiver circuitry. In step 905 a processing unit of the user device determines whether a ULInformationTransfer message has been prepared, and if so turns on the receiver circuitry, step 907. As such, according to this example the receiver circuitry is powered down while the user device is processing the DLInformationTransfer message and until the user device has prepared the ULInformationTransfer message.

According to another embodiment (not shown in a specific flow chart), the time period 55 of FIG. 5 can be similar to that described above for FIG. 9, but also include a time period corresponding to when the user device triggers a scheduling request to get uplink resources to transmit this message, and/or the time period waiting for an uplink resource to become ready, and/or the time period for transmitting the ULInformationTransfer message.

Thus, these embodiments provide power down periods while processing any of the optional DLInformationTransfer messages containing a NAS signalling message and until it builds the ULInformationTransfer message containing the corresponding NAS response message. This time thus includes the time for preparation of the NAS response message and the ULInformationTransfer message until the UE triggers a scheduling request to get UL resources to transmit the latter message.

Figure 10:
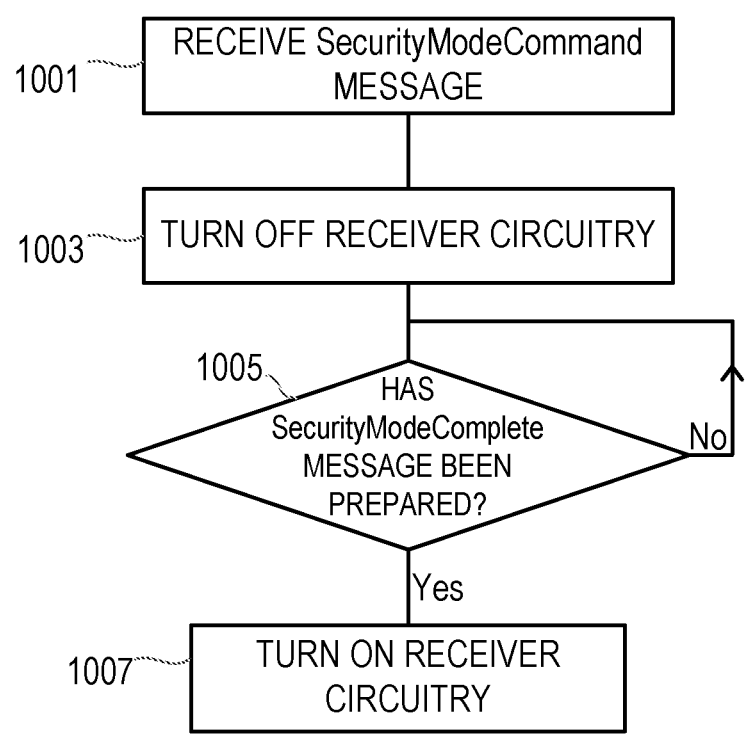
FIG. 10 shows a method according to another embodiment of the invention.

Referring to FIG. 10 in combination with FIG. 5, this describes an example of how a part or whole of a receiver circuitry may be powered down during a time period 56 shown in FIG. 5. The user device 40 receives a message, for example a SecurityModeCommand message, step 1001. In step 1003 the user device powers down the receiver circuitry of the user device. It is noted that this may involve powering down a part or the whole receiver circuitry, or circuitry associated with the receiver circuitry. In step 1005 a processing unit of the user device determines whether a subsequent uplink message, for example a SecurityModeComplete message has been prepared, and if so turns on the receiver circuitry, step 1007. As such, according to this example the receiver circuitry is powered down while the user device is processing the received SecurityMode Command message and until the user device has prepared the subsequent SecurityModeComplete message.

According to another embodiment (not shown in a specific flow chart), the time period 56 of FIG. 5 can be similar to that described above for FIG. 10, but also include a time period corresponding to when the user device triggers a scheduling request to get uplink resources to transmit this message, and/or the time period waiting for an uplink resource to become ready, and/or the time period for transmitting the SecurityModeComplete message.

Figure 11:
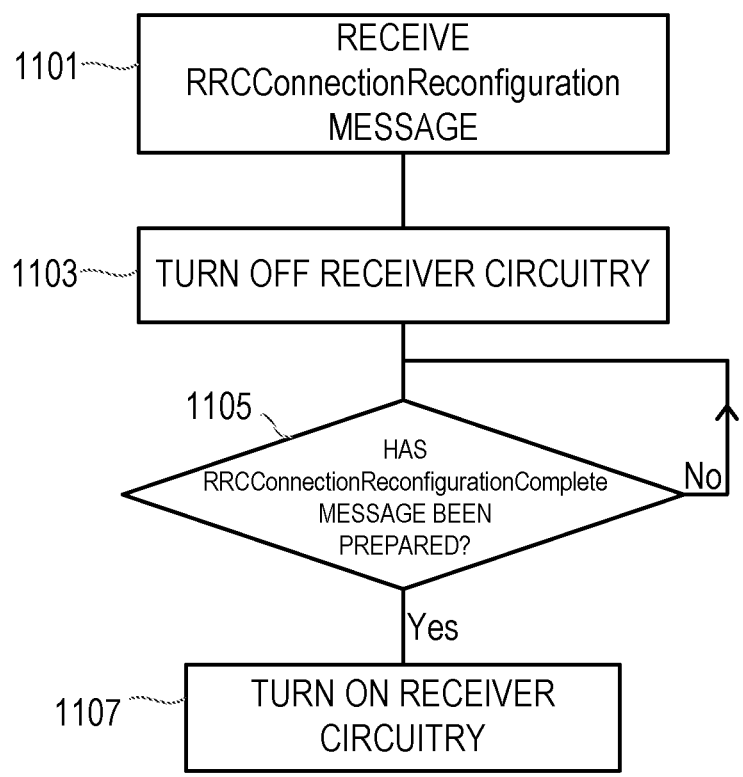
FIG. 11 shows a method according to another embodiment of the invention.

Referring to FIG. 11 in combination with FIG. 5, this describes an example of how a part or whole of a receiver circuitry may be powered down during a time period 57 shown in FIG. 5. The user device 40 receives a message, for example an RRCConnectionReconfiguration message, step 1101. In step 1103 the user device powers down the receiver circuitry of the user device. It is noted that this may involve powering down a part or the whole receiver circuitry, or circuitry associated with the receiver circuitry. In step 1105 a processing unit of the user device determines whether a subsequent uplink message, for example an RRCConnectionReconfigurationComplete message has been prepared, and if so turns on the receiver circuitry, step 1107. As such, according to this example the receiver circuitry is powered down while the user device is processing the RRCConnectionReconfiguration message and until the user device has prepared the RRCConnectionReconfigurationComplete message.

According to another embodiment (not shown in a specific flow chart), the time period 57 of FIG. 5 can be similar to that described above for FIG. 11, but also include a time period until the user device sends a scheduling request to get uplink resources to transmit this message, and/or the time period waiting for an uplink resource to become ready or available, and/or the time period for transmitting the RRC-Connection ReconfigurationComplete message.

It is noted that the embodiments of the invention are intended to embrace any one or more of the time periods mentioned above being used as power down periods during a transition from an idle mode to a connected mode of operation, either alone or in combination.

It is also noted that in any of the embodiments described above in FIGS. 6 to 11, the power down periods can be interrupted if the user device triggers lower layer feedback, for example a Radio Link Control (RLC) Acknowledgement. Triggering such messages also triggers transmission of a scheduling request which requires the user device to be monitoring the Physical Downlink Control Channel (PDCCH) for potential uplink grants.

Figure 12:
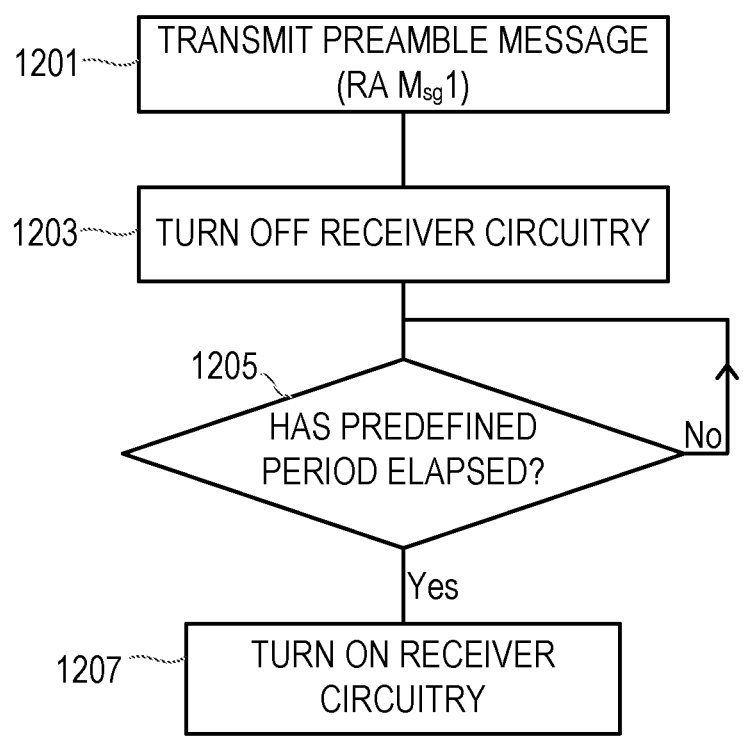
FIG. 12 shows a method according to another embodiment of the invention.
Figure 13:
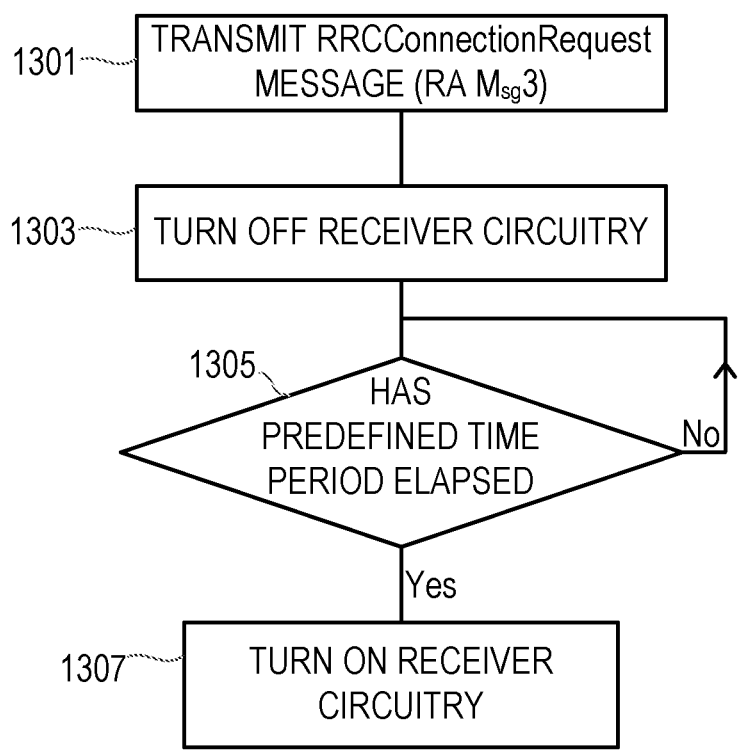
FIG. 13 shows a method according to another embodiment of the invention.

FIGS. 12 and 13 describe examples of embodiments whereby a part or whole of a receiver circuitry is powered down during and/or after an uplink transmission, for a duration during which it is unlikely that any downlink transmissions will be received from another node such as an Evolved NodeB (eNB).

According to these embodiments a user device may power down part or all of its receiver circuitry for short periods after uplink transmission (either in combination with one of the other power down periods described herein, or in isolation). The timing of these options can depend on the behaviour of another node, for example the control node, eNB, and specified communication protocols, such as LTE procedures, which is in contrast to some of the embodiments described above, whereby the power down periods depend on criteria local or within the user equipment device itself.

Although the examples are described for an LTE Frequency Division Duplex (FDD) configuration, a similar approach is possible for Time Division Duplex (TDD) as well with time values modified to best suit the chosen TDD configuration, or indeed any other form of communication protocol.

Referring to FIG. 12 in combination with FIG. 5, this describes an example of how a part or whole of a receiver circuitry may be powered down during a time period 51 shown in FIG. 5. In step 1201 the user device transmits a message, for example a preamble message (e.g. RA Msg1). In step 1203 the user device powers down the receiver circuitry of the user device. It is noted that this may involve powering down a part or the whole receiver circuitry, or circuitry associated with the receiver circuitry. In step 1205 a processing unit of the user device determines whether a predefined period has elapsed, and if so turns on the receiver circuitry, step 1207.

After sending the message, for example Msg1, the user device powers down part or whole of the receiver circuitry corresponding to an expected processing time of another node (or nodes), for example an eNB, which is processing the message which has been transmitted from the user device. For example, the random access Response window starts at the subframe that contains the end of the preamble transmission plus three subframes. This means there are at least three subframes after the one where the user device sends Msg1 during which the user device may keep its receiver circuitry powered down, and without missing the subsequent Response message (e.g. RA Msg2).

Referring to FIG. 13 in combination with FIG. 5, this describes an example of how a part or whole of a receiver circuitry may be powered down during a time period 53 shown in FIG. 5. In step 1301 the user device transmits a message, for example an RRCConnectionRequest message (RA Msg3). In step 1303 the user device turns off the receiver circuitry of the user device. It is noted that this may involve powering down a part or the whole receiver circuitry, or circuitry associated with the receiver circuitry. In step 1305 a processing unit of the user device determines whether a predefined period has elapsed, and if so turns on the receiver circuitry, step 1307.

Thus, in this example, after sending Msg3, the user device powers down power to part or whole of the receiver circuitry corresponding to an expected processing time of another node (or nodes), for example an eNB, which is processing the message which has been transmitted from the user device. For example, a typical expected processing time for this section corresponds to about 3 ms. The period that the receiver circuitry of the user device is powered down may be specified in order to avoid DRX synchronization state loss.

Although FIGS. 6 to 13 show examples of where power down periods may be provided, it is noted that the receiver circuitry may be powered down during one or more other time periods contained in FIG. 5, or other signalling sequences between an idle mode and a connected mode transition. For example, a user device may utilize processing times, preparation times, scheduling delays, etc. in a similar manner as in the examples described above in conjunction with FIGS. 6 to 13, wherein the involved messages may be one or more of messages 11, 14, 15 and 18 in FIG. 5.

For uplink data using the synchronous Hybrid Automatic Repeat request (HARQ) mechanism, the user device may power down its receiver after transmission until the expected feedback and potential adaptive retransmission grant for the same HARQ process. This allows the receiver circuitry of the user device to be powered down or switched off, for example, over the HARQ Round Trip Time (RTT) that corresponds to 8 ms in FDD. This mechanism can be applied for one or more uplink transmissions during the idle to connected mode transition procedure. If the user device is waiting for feedback and adaptive retransmission grants for other HARQ processes as well, this can be taken into account and may affect the length of the possible period during which the receiver circuitry is powered down.

According to some embodiments it is also possible for a user device to assume some minimum processing time after eNB reception. If this time is short (for example a few subframes) it is almost guaranteed the eNB will not be able to process the message and send an answer during a power down period of the user device. However, if the time assumed is too long, this may lead to the user device missing the downlink transmission (or assignment).

To avoid synchronization problems with the network due to shorter processing times than expected, a predetermined power down period may be limited for each of these power down opportunities. For example, different values may be used depending on the type of message being processed, received and/or transmitted. According to one embodiment the values can be fixed in specification and can correspond to the maximum processing times of RRC messages. In a further embodiment, a Medium Access Control (MAC) control element (CE) is extended to provide an indication of sleep time after which the user device should again be reachable. In one embodiment this MAC CE may be sent from the eNB to the UE and the indication of sleep time may be based on the processing times needed in the eNB.

It can be seen from the embodiments described above that different predefined power down periods can have different power down durations corresponding to a respective downlink message, an uplink message or a processing task or any combination thereof.

According to one embodiment a predefined power down period is smaller than a maximum processing delay time imposed by a radio resource control, RRC, protocol specification for a respective RRC message.

The current Radio Resource Control (RRC) protocol specification for LTE, (3GPP TS 36.331 V11.2.0 "3rd Generation Partnership Project; Technical Specifications Group Radio Access Network; Evolved Universal Terrestrial Radio Access (E-UTRA); Radio Resource Control (RRC); Protocol Specification; (Release 11)", December 2012), contains maximum processing delays for the different RRC messages shown in FIG. 5, from the point when the user device receives the message on the physical layer up to when the user device should be ready to receive an uplink grant for the reply. These times correspond to the maximum times for which the user device may not listen to PDCCH for grants after receiving the RRC messages. Therefore, the one or more predefined power down periods can be configured to be a predetermined time lower than these periods (because of lower protocol layer functions).

This has the advantage of setting a power-down period such that it is less than a maximum processing delay set for a particular downlink/uplink message.

According to another embodiment, a predefined power down period is specified by one or more time windows during which no downlink transmissions towards the user device are expected.

According to another embodiment, a predefined power down period is dynamically controlled depending upon how long a particular processing task is taking at the user device.

This has the advantage of allowing a part or whole of the receiver circuitry to be powered down for a period which is controlled based on rules relating to the behaviour of the user device itself, rather than RRC configuration parameters. For example, when user device receives a downlink message and powers down the receiver circuitry while processing this downlink message, the user device can keep the receiver circuitry powered down for as long as it takes to process the received downlink message. The power down period can therefore differ from one processing event to another, and between one user device and another, and change dynamically depending upon how long the user device is taking to process that particular event on a particular occasion (which may be affected by what else the user device is having to process).

According to one embodiment the method comprises the steps of interrupting a power down period in response to an internal control signal received from within the user device. This has the advantage of enabling a power down period to be interrupted in response to a control signal received from the user device, for example in response to the user device triggering a lower layer feedback (e.g. RLC acknowledgement).

According to one embodiment the method comprises the steps of receiving a system information parameter corresponding to a minimum processing delay in a control node associated with the user device, and setting a power down period based on the received system information parameter.

This has the benefit of covering the possibility of having a system information parameter, for example where the telecom specification is changed to allow this, so that DRX can be improved. With such an embodiment the processing delay at another node is specified explicitly, so that the user device is able to determine how long a corresponding power down period can be.

The system information parameter may be the same for all messages or processing events. Alternatively, the system information parameter may be the same for a group of messages or processing events. Alternatively, the system information parameter may be unique to each message or processing event. The value of the system information parameter may be chosen from a set of values, wherein each of the values in the set corresponds to a set of processing times or power down periods, wherein each of these processing times or power down periods is associated with a different processing event or a different message, e.g. an uplink signalling message being used in the idle to connected mode transition procedure. With this principle a single system information parameter may advantageously be used to provide information to the user device about all processing times and/or all allowed power down periods that may be involved in an idle to connected mode transition.

According to such embodiments it is possible to introduce a new system information parameter informing a user device about minimum processing times in a node such as an eNB. This enables the user device to use DRX, i.e. enter a DRX sleep mode, during these processing times, as proposed above. There are multiple options for how to configure minimum processing times. One option is to specify one minimum processing time which is assumed by the eNB and the user device during all processing times during the transition period. This parameter could also be included in more comprehensive information, such as a "eNB category" or "eNB capabilities" parameter similar to currently used user equipment categories (for example as specified in 3GPP TS 36.306 V11.2.0, "3rd Generation Partnership Project; Technical Specification Group Radio Access Network; Evolved Universal Terrestrial Radio Access (E-UTRA); User Equipment (UE) radio access capabilities (Release 11)", December 2012).

According to one embodiment, one or more predefined power down periods constitute a power saving mode of operation, and wherein the method comprises the step of receiving a control signal for instructing the user device to enter into the power saving mode of operation until the end of the transition from the idle mode of operation to the connected mode of operation, or until further notice (for example automatically entering the power saving mode during the next and subsequent idle to connected transition phases, until a further control signal is received to disable the power saving mode of operation).

This has the advantage, for example, of allowing the user device to be set-up in this mode for the remainder of a particular idle/connected mode transition, or for all subsequent idle/connected mode transitions until further notice. This may be set, for example, in response to a MAC CE command.

It is noted that the user device 40 described in FIG. 4 above may comprise a transmitter circuitry (or any other circuitry associated with a user device), and that the processing unit 43 can be adapted to perform any of the method steps described above in relation to the various embodiments of the invention.

The embodiments described above provide solutions whereby a temporary discontinuous reception mode behaviour is implicit for the idle to connected mode transition procedure. By implicit behaviour it is meant that a user device may follow simple rules, which are based on existing behaviour of the user device and are not directly dependent on any RRC configuration parameters. This mechanism may be configured and provided to a user device transparently, that is, the network does not need to be aware if the user device applies these rules or not.

The manner in which a user device is configured to operate may be provided, for example, through an Over-The-Air (OTA) Universal Subscriber Identity Module (USIM) configuration, or based on subscriber data in the USIM, or may be hardcoded when the user device is being designed. Alternatively, according to another embodiment a user device is configured by an application server through a message on the application layer. In addition, a possible option is that a network node such as an eNB configures the user device using a new DRX MAC Control Element.

During the temporary (or implicit) power down periods described above the embodiments work in a similar manner to a discontinuous reception mode mechanism, (for example as described in 3GPP TS 36.321 V11.0.0, "3rd Generation Partnership Project; Technical Specification Group Radio Access Network; Evolved Universal Terrestrial Radio Access (E-UTRA); Medium Access Control (MAC) protocol specification (Release 11)", September 2012), whereby the user device does not listen to or monitor the Physical Downlink Control Channel (PDCCH) continuously but may instead turn its receiver circuitry and associated equipment off on predefined occasions during the state transition procedure between idle mode and connected mode.

It is noted that, according to one embodiment, the one or more predetermined power down periods are controlled with a new DRX MAC Control Element. When the user device receives this MAC Control Element, it may go to sleep (have part or whole of its receiver circuitry powered down) according to the above described behaviour even though the legacy DRX mechanism is not configured yet. Then, a Scheduling Request (SR) transmission in uplink (either on the PUCCH or in the form of a Random Access) can trigger the user device to move to an active state again. The DRX MAC Control Element (CE) may be used to trigger the user device to apply the above described behaviour until the next uplink transmission or for the remainder of the idle to connected mode transition procedure, or for one or more subsequent idle/connected mode transitions. This can simply be done by concatenating the MAC CE into the same transport block with the downlink command after which no downlink activity is expected until the user device replies.

It is noted that a user device can also combine any one or more of the various power down periods described above, either after downlink or uplink transmission. This means, for example, that after receiving a message, the UE may keep its receiver circuitry powered down for the duration of the message processing and sending of uplink data until the first synchronous HARQ feedback is expected. As an example, the user device could enable its power down mechanism after receiving Msg2 in FIG. 5, until it expects to receive feedback from uplink Msg3.

The embodiments of the invention enable further energy savings to be provided in user devices, which is particularly advantageous in energy deprived MTC devices.

It can be seen that explicit configuration is not necessarily needed, but it is possible to introduce this, if wanted.

In some embodiments the power up of the receiver circuitry is triggered by the start of an uplink transmission, possibly with some delay to allow time for the receiving eNB and other potentially involved network entities (depending on the nature of the uplink transmission) to process the uplink transmission and prepare a response.

It can be seen from the above that the inventors have realised that significant power savings can be made during the transition period from an idle mode to a connected mode of operation.

Figure 14:
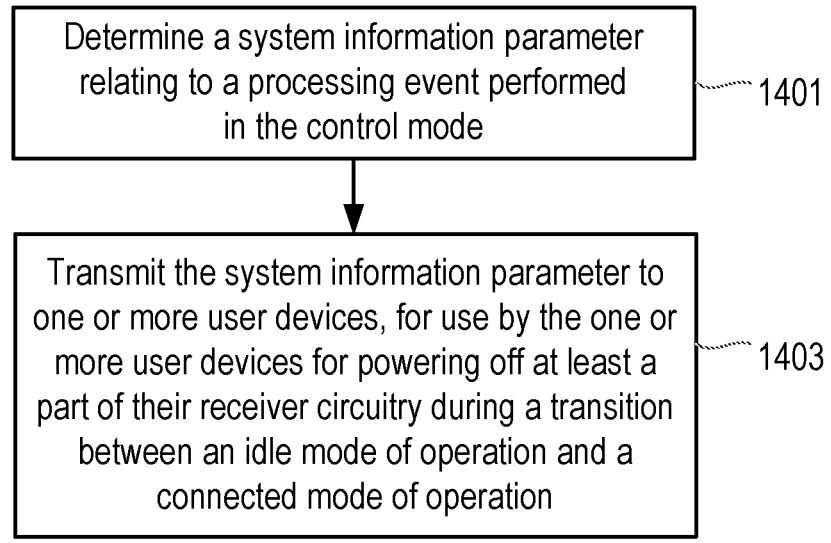
FIG. 14 shows a method performed in a control node according to another embodiment of the invention.

FIG. 14 shows a method performed in a control node of a communication system, according to another embodiment of the invention, where the communication system comprises one or more user devices that are operable in a discontinuous mode of operation. The control node may comprise any form of control node, including for example an Evolved NodeB, eNB. The method comprises the step of determining a system information parameter relating to a processing event performed in the control node, step 1401. In step 1403 the system information parameter is transmitted to the one or more user devices, for use by one or more user devices for powering down at least a part of their respective receiver circuitry during a transition between an idle mode of operation and a connected mode of operation.

The system information parameter may comprise information relating to a processing delay associated with a processing event performed in the control node, and/or a processing delay associated with processing uplink and/or downlink signalling messages relating to the transition between the idle mode and the connected modes of operation, and/or processing delays in the user devices.

According to one embodiment the system information parameter is the same for all messages or processing events. Alternatively, the system information parameter is the same for a group of messages or processing events. Alternatively, the system information parameter is unique to each message or processing event.

According to one embodiment the value of the system information parameter is chosen from a set of values, wherein each of the values in the set corresponds to a set of minimum processing delays, wherein each of these minimum processing delays is associated with a different processing event or a different message.

According to one embodiment the method performed in the control node comprises the step of transmitting a control signal to one or more user devices, the control signal instructing the user device to enter into a power saving mode of operation until the end of a transition from the idle mode of operation to the connected mode of operation, or until further notice.

Figure 15:
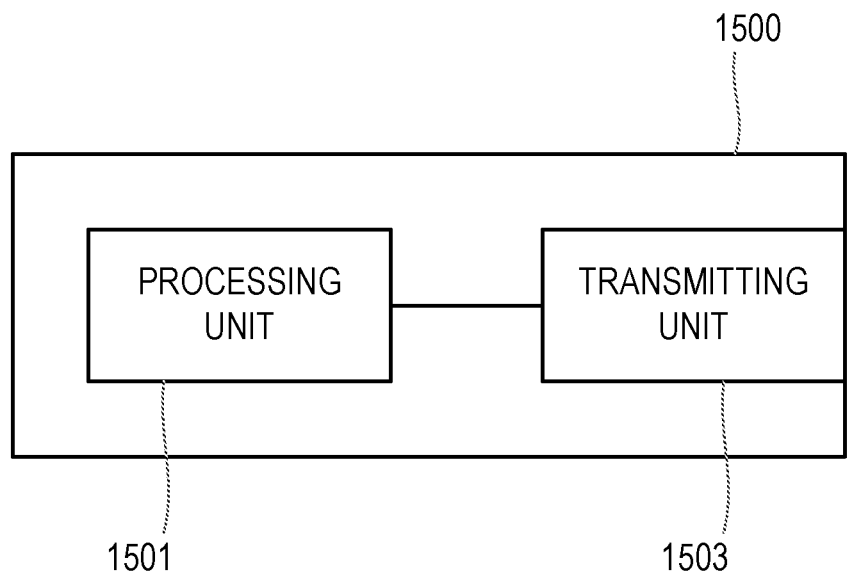
FIG. 15 shows a control node according to another embodiment of the invention.

FIG. 15 shows a control node 1500 of a communication system, according to another embodiment of the present invention, wherein the communication system comprises one or more user devices that are operable in a discontinuous mode of operation. The control node 1500 comprises a processing unit 1501 adapted to determine a system information parameter relating to a processing event performed in the control node 1500. The control node 1500 comprises a transmitting unit 1503 adapted to transmit the system information parameter to the one or more user devices, for use by one or more user devices for powering down at least a part of their respective receiver circuitry during a transition between an idle mode of operation and a connected mode of operation.

The system information parameter may comprise information relating to a processing delay associated with a processing event performed in the control node, and/or a processing delay associated with processing uplink and/or downlink signalling messages relating to the transition between the idle mode and the connected modes of operation, and/or processing delays in the user devices.

According to one embodiment the processing unit 1501 is adapted to generate a system information parameter that is the same for all messages or processing events, or a system information parameter that is the same for a group of messages or processing events, or a system information parameter that is unique to each message or processing event.

According to one embodiment the processing unit 1501 is adapted to select a value of the system information parameter from a set of values, wherein each of the values in the set corresponds to a set of minimum processing delays, wherein each of these minimum processing delays is associated with a different processing event or a different message.

According to one embodiment the transmitting unit 1503 is adapted to transmit a control signal to one or more user devices, the control signal instructing the one or more user devices to enter into a power saving mode of operation until the end of a transition from the idle mode of operation to the connected mode of operation, or until further notice.

The various embodiments show how a user device may power down its receiver circuitry, and related functions, during certain periods during the idle to connected mode transition. The user device may power down its receiver completely when it is processing messages after receiving them in downlink, and after sending uplink messages, for brief periods of time before expected HARQ feedback or when the specifications dictate a time window during which there are no expected downlink transmissions towards the UE.

References herein to powering down at least a part of a receiver circuitry during events such as transmission of an uplink message, processing a task, or while waiting for resources to become available, are intended to include the receiver circuitry being powered down for at least a portion of such events, for example at least a portion of the time period corresponding to when an uplink message is being transmitted, or at least a portion of the time period during which processing is taking place, or at least a portion of the time period waiting for resources to become available.

Furthermore, references to powering down at least a part of a receiver circuit include turning off power completely to at least a part of a receiver circuit, or reducing power to at least a part of a receiver circuit, for example reducing power to a low power state, or a combination of turning off and reducing power in different parts of a receiver circuit.

It is also noted that references herein to a transition between an idle mode and a connected mode are intended to include going from an idle mode to a connected mode, and/or going from a connected mode to an idle mode.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of saving power in a user device that is operable in a discontinuous reception mode, the user device comprising a receiver circuitry, and the method comprising the steps of:
   turning off power to at least a part of the receiver circuitry during one or more predefined power down periods during a transition between an idle mode of operation and a connected mode of operation of the user device, wherein the transition is the period in time between the user device transmitting a preamble message and the user device transmitting an RRCConnectionReconfiqurationComplete message.

2. The method as claimed in claim 1, wherein the one or more predefined power down periods are triggered by a downlink message received by the user device, and/or an uplink message transmitted from the user device, during the transition between the idle mode of operation and the connected mode of operation.

3. The method as claimed in claim 1, wherein the method comprises the steps of:
   receiving a downlink message during the transition from the idle mode of operation to the connected mode of operation; and powering down at least a part of the receiver circuitry during a period when the user device is processing the received downlink message.

4. The method as claimed in claim 1, wherein the method comprises the steps of:
receiving a downlink message during the transition from the idle mode of operation to the connected mode of operation; and
powering down at least a part of the receiver circuitry during a period when the user device is preparing a future uplink message and/or waiting for an uplink transmission resource to become available.

5. The method as claimed in claim 1, further comprising the steps of:
transmitting an uplink message during the transition from the idle mode of operation to the connected mode of operation; and
powering down at least a part of the receiver circuitry during transmission of the uplink message.

6. The method as claimed in claim 1, wherein a predefined power down period comprises a period when another device is processing an uplink message which has been transmitted from the user device.

7. The method as claimed in claim 1, wherein different predefined power down periods have different power down durations corresponding to a respective downlink message, an uplink message or a processing task.

8. The method as claimed in claim 1, wherein a predefined power down period is smaller than a maximum processing delay time imposed by a radio resource control (RRC) protocol specification for a respective RRC message.

9. The method as claimed in claim 1, wherein a predefined power down period is specified by one or more time windows during which no downlink transmissions towards the user device are expected.

10. The method as claimed in claim 1, wherein a predefined power down period is dynamically controlled depending upon how long a particular processing task is taking at the user device.

11. The method as claimed in claim 1, further comprising interrupting a power down period in response to an internal control signal received from within the user device.

12. The method as claimed in claim 1, further comprising the steps of:
receiving a system information parameter corresponding to a minimum processing delay in a control node associated with the user device; and
setting a power down period based on the received system information parameter.

13. The method as claimed in claim 12 wherein:
the system information parameter is the same for all messages or processing events; or
the system information parameter is the same for a group of messages or processing events; or
the system information parameter is unique to each message or processing event.

14. The method as claimed in claim 12, wherein:
the value of the system information parameter is chosen from a set of values, wherein each of the values in the set corresponds to a set of minimum processing delays, wherein each of these minimum processing delays is associated with a different processing event or a different message.

15. The method as claimed in claim 1, wherein the one or more predefined power down periods constitute a power saving mode of operation, and wherein the method further comprises the step of receiving a control signal for instructing the user device to enter into the power saving mode of operation until the end of the transition from the idle mode of operation to the connected mode of operation, or until further notice.

16. A user device that is operable in a discontinuous reception mode, the user device comprising:
receiver circuitry; and
a processor;
wherein the processor is adapted to power down at least a part of the receiver circuitry during one or more predefined power down periods during a transition between an idle mode of operation and a connected mode of operation of the user device, wherein the transition is the period in time between the user device transmitting a preamble message and the user device transmitting an RRCConnectionReconfigurationComplete message.

17. The user device as claimed in claim 16, wherein the user device further comprises transmitter circuitry, and wherein the one or more predefined power down periods are triggered by a downlink message received by the user device, and/or an uplink message transmitted from the user device, during the transition between the idle mode of operation and the connected mode of operation.

18. The user device as claimed in claim 16, wherein:
the receiver circuitry is adapted to receive a downlink message during the transition from the idle mode of operation to the connected mode of operation; and
the processor is adapted to power down at least a part of the receiver circuitry during a period when the user device is processing the received downlink message.

19. The user device as claimed in claim 16, wherein:
the receiving circuitry is adapted to receive a downlink message during the transition from the idle mode of operation to the connected mode of operation; and
the processor is adapted to power down at least a part of the receiver circuitry during a period when the user device is preparing a future uplink message and/or waiting for an uplink transmission resource to become available.

20. The user device as claimed in claim 16 further comprising:
transmitting circuitry adapted to transmit an uplink message during the transition from the idle mode of operation to the connected mode of operation; and
wherein the processor is adapted to power down at least a part of the receiver circuitry during transmission of the uplink message.

21. The user device as claimed in claim 16, wherein the processor is adapted to dynamically control a predefined power down period depending upon how long a particular processing task is taking at the user device.

22. A control node of a communication system, the communication system comprising one or more user devices that are operable in a discontinuous mode of operation, the control node comprising:
a processor adapted to determine a system information parameter relating to a processing event performed in the control node; and
a transmitter adapted to transmit the system information parameter to the one or more user devices, for use by one or more user devices for powering down at least a part of their respective receiver circuitry during a transition between an idle mode of operation and a connected mode of operation, wherein the transition is the period in time between the user device transmitting a preamble message and the user device transmitting an RRCConnectionReconfigurationComplete message.

23. The control node as claimed in claim 22, wherein the system information parameter comprises information relating to a processing delay associated with a processing event performed in the control node, and/or a processing delay associated with processing uplink and/or downlink signalling messages relating to the transition between the idle mode and the connected modes of operation, and/or processing delays in a user device.

24. The control node as claimed in claim 22, wherein the processor is adapted to generate a system information parameter that is the same for all messages or processing events, or a system information parameter that is the same for a group of messages or processing events, or a system information parameter that is unique to each message or processing event.

* * * * *